US011115530B1

(12) United States Patent
Andar et al.

(10) Patent No.: US 11,115,530 B1
(45) Date of Patent: Sep. 7, 2021

(54) INTEGRATION OF HUMAN AGENT AND AUTOMATED TOOLS FOR INTERACTIVE VOICE RESPONSE (IVR) SYSTEMS

(71) Applicant: Bank of America Corporation, Charlotte, NC (US)

(72) Inventors: Ravisha Andar, Plano, TX (US); Ramakrishna R. Yannam, The Colony, TX (US); Ashwini Patil, Richardson, TX (US); Priyank R. Shah, Plano, TX (US)

(73) Assignee: Bank of America Corporation, Charlotte, NC (US)

(*) Notice: Subject to any disclaimer, the term of this patent is extended or adjusted under 35 U.S.C. 154(b) by 0 days.

(21) Appl. No.: 16/908,893

(22) Filed: Jun. 23, 2020

(51) Int. Cl.
*H04M 3/493* (2006.01)
*G06F 40/40* (2020.01)
*H04M 3/42* (2006.01)

(52) U.S. Cl.
CPC .......... *H04M 3/4936* (2013.01); *G06F 40/40* (2020.01); *H04M 3/42382* (2013.01); *H04M 3/4933* (2013.01)

(58) Field of Classification Search
CPC . G06F 40/40; H04M 3/42382; H04M 3/4933; H04M 3/4936

USPC ...................... 379/67.1–88.28, 265.01–266.1; 370/351–357; 709/201–207, 217–248
See application file for complete search history.

(56) References Cited

U.S. PATENT DOCUMENTS

| | | | |
|---|---|---|---|
| 7,436,948 B1 * | 10/2008 | Thenthiruperai ... | H04M 3/4936 379/142.06 |
| 8,027,458 B1 * | 9/2011 | Pollock ............... | H04M 3/5166 379/265.12 |
| 2012/0008754 A1 * | 1/2012 | Mukherjee ............. | G10L 15/22 379/88.18 |

* cited by examiner

*Primary Examiner* — Hemant S Patel
(74) *Attorney, Agent, or Firm* — Weiss & Arons LLP; Michael A. Springs, Esq.

(57) ABSTRACT

When a caller initiates a conversation with an interactive voice response ("IVR") system, the caller may be transferred to a live agent. Apparatus and methods are provided for integrating automated tools and artificial intelligence ("AI") into the interaction with the IVR system. The automated tools and AI may track the conversation to decipher when to transfer the caller to the agent. The agent may determine which machine generated responses are appropriate for the caller. AI may be leveraged to suggest responses for both caller and agent while they are interacting with each other. The agent may transfer back the caller to the IVR system along with the appropriate machine generated response to maintain efficiency and shorten time of human agent interaction.

15 Claims, 4 Drawing Sheets

INTEGRATION OF HUMAN AGENT AND AUTOMATED TOOLS FOR INTERACTIVE VOICE RESPONSE (IVR) SYSTEMS

FIELD OF TECHNOLOGY

Aspects of the disclosure relate to technology for improving computer-human interactions.

BACKGROUND OF THE DISCLOSURE

Interactive voice response ("IVR") systems receive inputs from callers. The inputs may be voice, text or selections. These inputs typically correspond to the caller attempting to express a purpose or goal of the caller. IVR systems use a variety of techniques to correctly discern the meaning of the caller inputs and allow the caller to efficiently achieve their purpose or goal.

However, the IVR system may not be able to accurately discern the purpose or goal of the caller. In such instances, the IVR system may be configured to transfer the caller to a human agent. Typically, after the caller is transferred to the human agent, the human agent exclusively attends to the caller without further automated assistance from the IVR system.

It would be desirable to enable the human agent to transfer back the caller to the IVR system once the human agent identifies the purpose or goal of the caller. It would be further desirable for the human agent to provide the correct response to the IVR system thereby improving efficiency and speed of the IVR system and simultaneously decreasing the length of time of involvement of the human agent.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
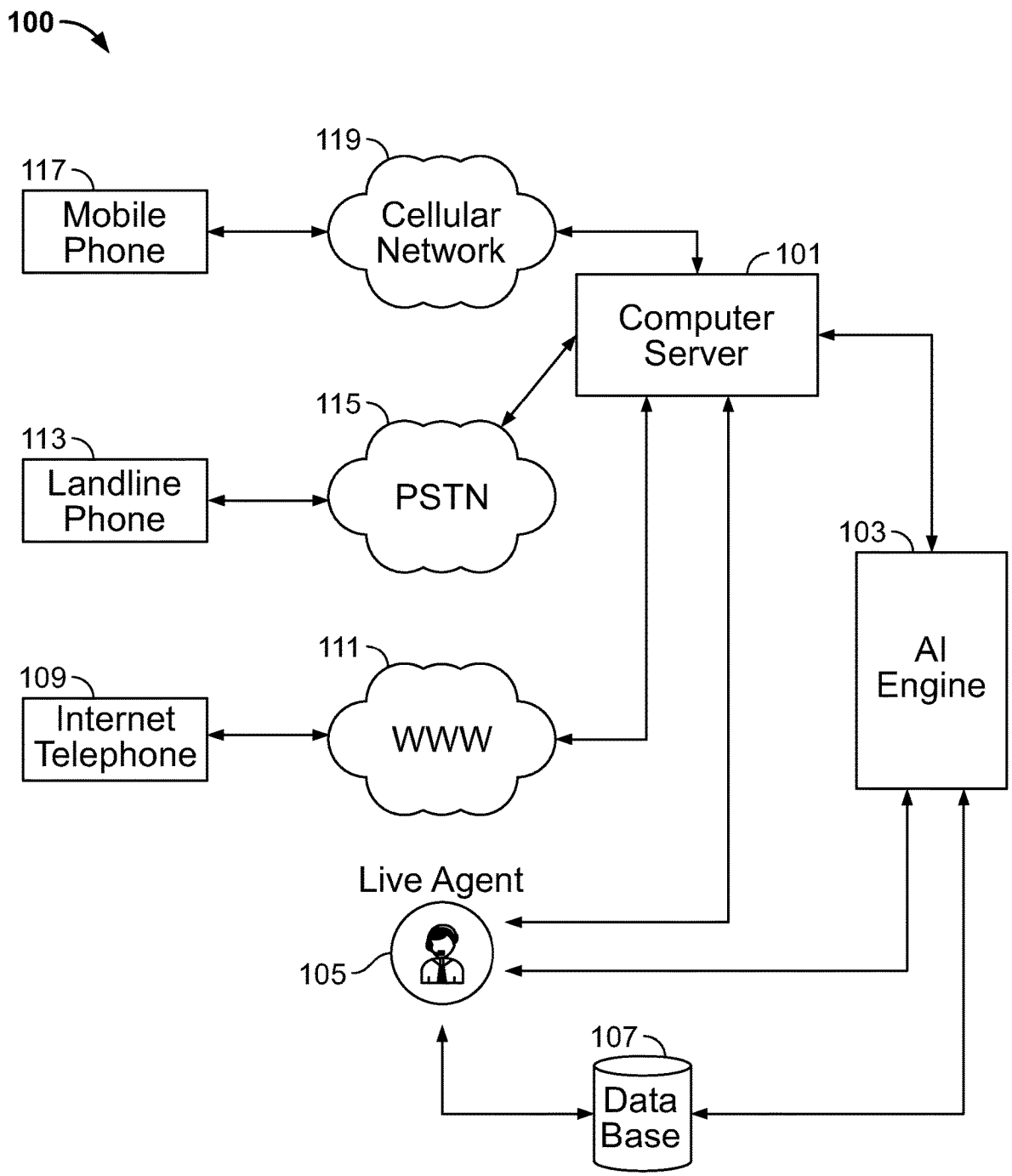
FIG. 1 shows an illustrative system in accordance with principles of the disclosure.

Methods are provided for leveraging artificial intelligence to integrate human and machine responses within an interactive voice response ("IVR") system. The IVR system may be associated with an entity.

Methods may include receiving an initiation of a conversation with a human caller and an artificial intelligence ("AI") engine. The conversation may include a request from the human caller. The request may be associated with the human caller's personal account. The account may be an account within the entity of the IVR system. The request may be associated with an online personal account. The request may be associated with an issue the human caller is experiencing in association with his account.

Methods may include providing, to the AI engine, voice inputs generated by the human caller. Methods may include processing the voice inputs using natural language processing ("NLP".)

Methods may also include providing automated machine generated responses from the AI engine in an attempt to answer the request received from the human caller.

Methods may include tracking a length of time of the conversation with the human caller and the AI engine. The tracking may include tracking the length of time of the voice inputs received from the human caller combined with the length of time of the automated responses received from the AI engine.

Methods may include automatically transferring the human caller and the voice inputs to a human agent when the length of time is equal to a first pre-determined amount of time and a satisfactory response to the request has not yet been provided by the AI engine.

The first pre-determined amount of time may be the average time it takes for a request to be expressed by a human caller along with a first attempted response to be provided by the AI engine. This average time may be 15 seconds. The average time may be 20 seconds. The average time maybe 25 seconds. In some embodiments, the average time may be equal to or less than 30 seconds. The average length of time may differ depending on the human caller. Some callers may express their request quickly. Some callers may express their request very slowly and clearly.

Methods may include using machine learning to identify the personality of the caller. Methods may include storing characteristics associated with the voice, decibel level and length of conversation associated with the caller. In a subsequent call from the caller, methods may include determining a personalized length of time to be used as the pre-determined amount of time. The personalized length of time being based off of the voice, decibel level and length of conversations from previous calls.

The satisfactory response may include a response that triggers a user's-side i.e.—human caller delay of a second pre-determined amount of time. The second pre-determined amount of time may be 3 seconds. The second pre-determined amount of time may be equal to or greater than 10 seconds. The delay may be because the human caller is satisfied with the response and terminates the call. The delay may be due to a transfer of the human caller to a human agent. The delay may be due to the human caller's receipt of a text message from the AI agent. Methods may include selecting the link provided by the AI agent in the text-message in response to the conversation.

The text message may include a hyperlink linking the human caller to online data that may be associated with the request. The human caller may terminate the call and access the link provided by the AI agent.

In some embodiments, the tracking may also include tracking sequences of utterances within the conversation. A sequence of utterances may include a sentence. A sequence of utterances may be a few words expressing the request. When the human caller repeats a sequence of utterances more than one time, methods may include automatically transferring the human caller to the human agent. When a sequence of utterances is repeated twice, it may indicate a slight beginning of frustration within the human caller. Methods may include transferring the human caller to the human agent prior to a rise in frustration from the human caller.

In some embodiments, the tracking may further include monitoring a decibel level of a voice of the human caller. An average decibel level in a normal conversation is approximately 60 decibels with a normal maximum of 70 decibels. In some embodiments, when the decibel level reaches a level greater than 60 decibels, methods may include automatically transferring the human caller to the human agent. In some embodiments, when the decibel level reaches a level equal to or greater than 70 decibels, methods may include automatically transferring the human caller to the human agent.

Following the transferring of the human caller and the voice inputs to the human agent, methods may include continuing the conversation with the human caller and the human agent. Simultaneous to the continuing of the conversation, methods may include continuously providing the voice inputs generated by the human caller to the AI engine.

Methods may include determining, by the human agent, a type of request based on the transferred voice inputs and the continuing conversation between the human caller and the human agent.

Methods may include receiving by the AI agent, a selected machine generated response provided by the human agent based on the determination of the type of request. The selected response may be selected from a list of responses stored in a database of the IVR system. The list of responses may include an initially generated list. The list of responses may additionally include machine learning responses generated based off of responses provided by human agents in previously received calls within the IVR system.

In some embodiments, the human agent may edit a machine generated response selected. The human agent may edit the machine generated response so that it addresses more directly a specific question or concern raised by the caller. However, even when after any editing, the machine generated response may reduce a response-time latency of the human agent. For example, providing the machine generated response may increase a number of callers that may be concurrently managed by a single human agent.

In some embodiments, methods may include providing the selected response by the human agent to the human caller. This may enable the human caller to continue conversation with the human agent even after the satisfied response is provided. This may also cause the human agent to remain connected to the human caller.

In other embodiments, methods may include transferring back the human caller to the AI engine to provide the selected machine generated response to the human caller. This may allow for the human agent to disconnect from communicating with the human caller while providing the correct response to the human caller, via the AI agent.

In this embodiment, methods may include partially disconnecting the human agent from the conversation. Methods may include providing a display screen to the human agent to enable the human agent to monitor the success of the transfer back to the AI agent. Methods may include continuously providing a voice-to-text rendition of the continuing conversation on the display screen. The display screen may be positioned within close proximity of the human agent.

In the event that the selected response is not the satisfactory response, methods may include alerting the human agent. The alert may include displaying an alert on the display screen to alert the human agent. In some embodiments, the alert may include changing a background-color on the display screen in order to alert the human agent.

In response to the alert, methods may include re-connecting the human agent to complete the conversation with the human caller.

In some embodiments, an IVR system is provided. The IVR system may include a telephony server. The IVR system may be associated with an entity. The IVR system may enable a user of the system and/or a potential user to communicate with the entity by voice. The IVR system may enable a user to request information, submit payments, ask questions, retrieve personal data associated with an account within the entity, sign up to become a member of the entity and any other suitable requests.

The IVR system may utilize an automated artificial intelligent agent to communicate with the user. The IVR system may utilize machine learning to decipher when preferable to transfer the user to a human agent. The IVR system, in accordance with principles of the disclosure, may transfer the user to a human agent at the point prior to when the user may be already frustrated and desperate. The IVR system may also transfer the user to a human agent at the point prior to when it may become necessary and essential.

The IVR system may include a telephony server. The telephony server may be a computer server. The server may be a network connected computer system. Computer servers, as disclosed herein, may include a processor circuit. The processor circuit may control overall operation of the server and its associated components. The processor circuit may include hardware, such as one or more integrated circuits that form a chipset. The hardware may include digital or analog logic circuitry configured to perform any suitable (e.g., logical) operation.

For example, a server may include one or more of the following hardware components: I/O circuitry, which may include a transmitter device and a receiver device and may interface with fiber optic cable, coaxial cable, telephone lines, wireless devices, physical network layer hardware, a keypad/display control device or any other suitable encoded media or devices; peripheral devices, which may include counter timers, real-time timers, power-on reset generators or any other suitable peripheral devices; a logical processing device, which may compute data structural information, structural parameters of the data, or quantify indices; and machine-readable memory.

Machine-readable memory may be configured to store, in machine-readable data structures: machine learning algorithms, AI algorithms, or any other suitable information or data structures. Components of the server may be linked by a system bus, wirelessly or by other suitable interconnections. System components may be present on one or more circuit boards. In some embodiments, the components may be integrated into a single chip. The chip may be silicon-based.

The server may include RAM, ROM, an input/output ("I/O") module and a non-transitory or non-volatile memory. The I/O module may include a microphone, button and/or touch screen which may accept user-provided input. The I/O module may include one or more of a speaker for providing audio output and a video display for providing textual, audiovisual and/or graphical output.

Software applications may be stored within the non-transitory memory and/or other storage medium. Software applications may provide instructions to the processor that enable the server to perform various functions. For example, the non-transitory memory may store software applications such as an operating system, application programs, and an associated database. Some or all of computer executable instructions of the server may be embodied in hardware or firmware components of the server.

The server may include cloud computing and virtualization implementations of software. Such implementations may be designed to run on a physical server supplied externally by a hosting provider, a client, or other virtualized platform.

Software application programs, which may be used by the server, may include computer executable instructions for invoking user functionality related to communication, such as email, short message service ("SMS"), and voice input and speech recognition applications. Software application programs may utilize one or more algorithms that formulate predictive machine responses, formulate database queries, process human caller inputs, process human agent inputs, or any other suitable tasks.

A server may include a communication circuit. The communication circuit may include a network interface card or adapter. When used in a WAN networking environment, apparatus may include a modem, antenna or other circuitry for establishing communications over a WAN, such as the Internet. The communication circuit may include a modem and/or antenna. The existence of any of various well-known protocols such as TCP/IP, Ethernet, FTP, HTTP and the like is presumed, and the server may be operated in a client-server configuration to permit retrieval of web pages from a web-based server. Web browsers can be used to display and manipulate data on web pages.

A server may include various other components, such as a display, battery, speaker, and antennas. Network connected systems may be portable devices such as a laptop, tablet, smartphone, other "smart" devices (e.g., watches, eyeglasses, clothing having embedded electronic circuitry) or any other suitable device for receiving, storing, transmitting and/or displaying electronic information.

A server may include, and may be operational with, numerous other general purpose or special purpose computing system environments or configurations. Examples of well-known computing systems, environments, and/or configurations that may be suitable for use with this disclosure include, but are not limited to, personal computers, server computers, handheld or laptop devices, tablets, "smart" devices (e.g., watches, eyeglasses, clothing having embedded electronic circuitry) mobile phones, multiprocessor systems, minicomputer systems, microprocessor systems, mainframe computers, distributed computing environments that include any of the above systems or devices, and the like.

A server may utilize computer-executable instructions, such as program modules, executed by a processor. Generally, program modules include routines, programs, objects, components, data structures, etc. that perform particular tasks or implement abstract data types. A server may be operational with distributed computing environments where tasks are performed by remote processing devices that are linked through a communications network. In a distributed computing environment, program modules may be located in both local and remote computer storage media including memory storage devices. A server may rely on a network of remote servers hosted on the Internet to store, manage, and process data (e.g., "cloud computing" and/or "fog computing").

Servers disclosed herein may be produced by different manufacturers. For example, the caller may connect to the IVR system via a first server, and the AI engine may be run on a second server. A human agent may utilize a third server. Servers may capture data in different formats. Servers may use different data structures to store captured data. Servers may utilize different communication protocols to transmit captured data or communicate with other systems. Despite such operational differences, servers may be configured to operate substantially seamlessly to interact with the caller, human agent and the AI engine across different systems operating systems, hardware or networks.

The telephony server within the IVR system may be configured to receive an initiation of a conversation. The initiation of the conversation may be initiated and submitted by a caller using a communication network. The caller may be a human caller. The caller may be a user/customer of the entity associated with the system. The caller may be a potential customer of the entity. The conversation may include voice inputs associated with a request. The voice inputs may constitute the conversation from the caller's end. In some embodiments, the inputs submitted by the caller may include voice inputs, text, touch or any suitable inputs.

The telephony server may also be configured to provide an interface for the caller to interact with an artificial intelligence ("AI") engine over the communication network. The telephony server may be configured to transmit to the caller, over the communication network, responses to the voice inputs generated by the AI engine.

The IVR system may also include an application server. The application server may host the AI engine. The application server may provide computer resources (hardware and software) for the implementing the AI engine. The application server may provide access to network connections for the AI engine to interact with callers and human agents.

The application server may be configured to receive, continuously, from the telephony server, the voice inputs generated by the caller. The application server may also be configured to receive, continuously, the responses to the voice inputs generated by the AI engine.

The application server may be configured to generate a machine interpretation of the voice inputs. The generating of the machine interpretation may be generated using NLP methods. The machine interpretation may identify the caller. The machine interpretation may identify a purpose, question or concern of the caller.

The application server may also be configured to monitor the voice inputs. The application server may also be configured to monitor the responses to the voice inputs generated by the AI engine.

The application server may monitor the voice inputs by tracking a length of time of the continuously received voice inputs generated by the caller. The tracking may include tracking the time from the time of initiation of the conversation. The tracking of the time may also include tracking the length of time of the voice inputs including each delay between voice inputs. A delay may include a moment of silence between words being expressed by the caller. A delay may also include a moment of silence between the request from the caller and a response being generated by the AI engine. The total time of the conversation may be tracked. The tracking may enable deciphering, preferably, an appropriate time to transfer the caller to a human agent. The appropriate time may be a time prior to the caller becoming frustrated.

The application server may be configured to determine, based on the tracking, when the length of time is equal to a first pre-determined amount of time and a satisfactory response to the request has not yet been provided by the AI engine. The satisfactory response may include a response that triggers a user's-side delay of a second pre-determined amount of time. When the length of time is equal to the first pre-determined amount of time and the satisfactory response has not been provided, the application server may be configured to transmit an instruction to the telephony server to automatically transfer the caller to a human agent.

In some embodiments, the tracking may include tracking sequences of utterances from the voice inputs received from the human caller. When a caller repeats a sequence of utterances more than one time, the application server may be configured to automatically transfer the caller to the human agent.

It should be appreciated that the tracking of sequences of utterances may also include tracking for a repetition of at least two or more words from each sequence of utterances. For example, a caller may request at the first time "Please can I have my account balance." This request may be recorded and tracked as a sequence of utterances. The AI agent may attempt to respond to the caller's request. If the AI agent does not accurately respond, the caller may repeat the request a second time but in a shorter more abrupt version. The second time around may be expressed as "my account balance." This second time request may be recorded as another sequence of utterances. The tracking may determine that the second sequence of utterances is repeating at least two words from the first sequence. This repetition may induce an automatic transfer to a human agent.

The database may be configured to store sequences of utterances received from the caller. The database may also store the selected response selected by the live agent in response to the sequence of utterances expressed by the caller when the caller is satisfied with the selected response. The system may be configured to use machine learning to enable the AI agent to respond with the correct response in the event that the caller initiates a request at a later time with the same or at least similar sequence of utterances.

The application server may be configured to link a terminal accessible by the human agent to the application server. The terminal may be a computer terminal. The computer terminal may be a computer server. The application server may also be configured to transmit to the human agent, the machine interpretation of the voice inputs and the responses generated by the AI engine.

The application server may further be configured to enable continuing the conversation, via the terminal, between the caller and the human agent.

Based on the continued conversation and the machine interpretation of the voice inputs, determine by the human agent, a request of the caller, the request being associated with the voice inputs generated by the caller.

The application server may be further configured to, following the determination of the request, receive, from the human agent, a selected machine generated response associated with the request. The machine generated selected response may be the satisfactory response. The application server may further be configured to pause the terminal linking the communication between the human agent and the caller. The application server may then transfer the terminal to the AI agent to provide the selected response to the caller.

The IVR system may include at least one database. The database may store transaction information associated with the caller. The database may be run on one or more computer servers. The database may run an application program interface ("API") that is compatible with the AI engine. The API may provide the AI engine access to the information stored on the database. The information stored on the database may include real-time and/or historical transaction data.

Machine interpretations of caller inputs may be generated by the AI engine based on the transaction information extracted from the database. The AI engine may extract and analyze transaction information before providing a machine generated response to the caller or human agent.

Additionally, when the caller is transferred at the first time from the AI agent to the human agent, the AI engine may provide the human agent with historical conversations conducted with the human caller. The historical conversations may include those conducted between the caller and the AI engine. The historical conversations may include those conducted between the caller and the human agent. The historical conversations may include those conducted between the caller and the AI engine and human agent operating in parallel.

The historical conversation may provide the human agent insight on a typical concern of the caller or an outstanding caller concern that has not yet been resolved. The insight may allow the human to identify a concern of a caller faster than had the human agent had to interact with the caller to identify the concern. Such human-computer interaction may shorten response time of human agents and improve efficiency of human agents.

The AI engine may generate a predicative indicator for a target historical conversation most relevant to the current conversation. For example, based on inputs provided by the caller, the AI engine may determine a context of a current conversation. The AI engine may review historical conversations and determine whether the caller's current concern is an issue the caller has raised in the historical conversations. The AI engine may locate and display to the human agent target historical conversations associated with the caller's current concern.

The AI engine may highlight to the human agent how the caller's concern raised in the target historical conversations had been resolved. The human agent may utilize solutions highlighted by the AI engine during the current conversation. Such human-computer interaction may shorten response time of human agents and improve efficiency of human agents.

The AI engine may load target conversations into a computer system used by the human agent. The AI engine may load a transaction history associated with the target conversation into a computer system used by the human agent. For example, the AI engine may determine that the caller is now concerned about credit card charges. The AI engine may determine that the caller has previously conducted target historical conversations regarding credit card charges.

The AI engine may locate relevant target historical conversations that include the caller raising concerns regarding credit card charges. The AI engine may locate relevant transactional information that triggered the charges the caller had previously been concerned about. The AI engine may locate recent charges associated with the caller's card account that, based on the historical conversations and transactions, may have triggered the caller's current concern.

The AI engine may display the target historical conversations and associated transactions to the human agent. The display of the target historical conversations and associated transactions may allow the human agent to efficiently understand a context of the caller's current concern, without directly querying the caller. Using the AI engine to provide the human agent with a contextual understanding may allow the human agent to provide detailed and more efficient customer service. Using the AI engine to provide the contextual understanding may allow the human agent to service more callers per unit of time.

The application server may be further configured to continuously provide to the human agent, a voice-to-text rendition of the continuing conversation on a display screen. The display screen may be positioned within proximity of the human agent. When the selected response provided by the AI engine to the human caller is not the satisfactory response, the application server may be configured to transmit an alert to the human agent on the display screen.

One of ordinary skill in the art will appreciate that the steps shown and described herein may be performed in other than the recited order and that one or more steps illustrated may be optional. Apparatus and methods may involve the use of any suitable combination of elements, components, method steps, computer-executable instructions, or computer-readable data structures disclosed herein.

Illustrative embodiments of apparatus and methods in accordance with the principles of the invention will now be described with reference to the accompanying drawings, which form a part hereof. It is to be understood that other embodiments may be utilized and that structural, functional and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

FIG. 1 shows illustrative system 100. System 100 includes computer server 101. Computer server 101 may be a telephony server. Computer server 101 may receive inputs submitted by a caller using mobile phone 117 and cellular communication network 119. Computer server 101 may receive inputs submitted by a caller using landline phone 113 and public switched telephone network ("PSTN") 115. Computer server 101 may receive inputs submitted by a caller using internet phone 109 and internet 111.

Computer server 101 may be configured to receive inputs concurrently from multiple callers using different devices and communication networks. Computer server 101 may provide an interface for the callers to access AI engine 103 using any of communication networks 111, 115 or 119. Computer server 101 may transmit to a caller (e.g., using devices 109, 113 or 117) responses to the voice inputs generated by AI engine 103. AI engine 103 may be hosted on an application server.

Based on inputs received from devices 109, 113 or 117 via computer server 101, AI engine 103 generates a machine interpretation of inputs received from devices 109, 113 or 117. AI engine 103 may determine whether one or more of devices 109, 113 or 117 require intervention by human agent 105.

Computer server 101 may track the length of time the caller and the AI engine are in communication. Computer server 101 may activate AI engine to link devices 109, 113 or 117 to human agent 105 when the length of time of the communication between the caller and the AI engine is greater than a pre-determined amount of time.

After linking devices 109, 113 or 117 and human agent 105, AI engine 103 receives, from computer server 101 additional inputs generated by devices 109, 113 or 117. Human agent 105 may receive the machine interpretation of the inputs received to identify the request of the caller. Human agent 105 may request additional details from the caller to more accurately decipher the request coming from the caller. When human agent 105 identifies the request of the caller, human agent 105 may select an appropriate and satisfactory machine generated response stored on database 107. Once a response is selected, human agent 105 may initiate a transfer of the caller back to the AI engine 103, via the computer server 101. The satisfactory machine generated response may also be transferred to the AI engine 103.

AI engine 103 may then provide the machine generated response to the caller via communication networks 119, 115 and/or 111. The caller may be satisfied with the machine generated response and terminate the communication with the IVR system. The selected machine generated response and the request submitted by the caller may be stored as a pair on database 107 and may be associated with an account of the caller for future calls received from the caller.

The caller, in some circumstances may not be satisfied and the caller may be transferred back to the live agent 105 to complete the request and complete the call.

In some embodiments, AI engine 103 may access transaction data stored on database 107. Based on transaction data stored on database 107, AI engine 103 may customize the first set of machine generated responses. For example, a transaction data stored in database 107 may allow AI engine 103 to determine a purpose why devices 109, 113 or 117 have initiated contact with telephony server 101. AI engine 103 may detect a recent or an anomalous transaction that is likely the cause for contacting telephony server 101. AI engine 103 may use transaction data stored on database 107 to provide machine generated responses that include relevant and customized data to devices 109, 113 or 117.

AI engine may also generate a set of machine response to the additional inputs. The set of machine generated responses may be provided to human agent 105. AI engine 103 may use transaction data stored on database 107 to provide machine generated responses that include relevant and customized data extracted from database 107. For example, AI engine 103 may provide human agent 103 a transcript or transactions determined to be relevant to the additional inputs. Relevant transcripts and transactions may be located based on an identity of the caller or prior communication/interaction with devices 109, 113 or 117.

Transferring the caller from one of 117, 113 and 109 to the human agent 105 prior to exceeding the pre-determined length of time which when exceeded the caller may already be frustrated, and further transferring the caller back to the AI engine to provide a selected response via the human agent 105, reduces a duration of time the human agent 105 may be needed to be on the call for and further enables the AI engine to turnaround and provide the correct response quickly.

Figure 2:
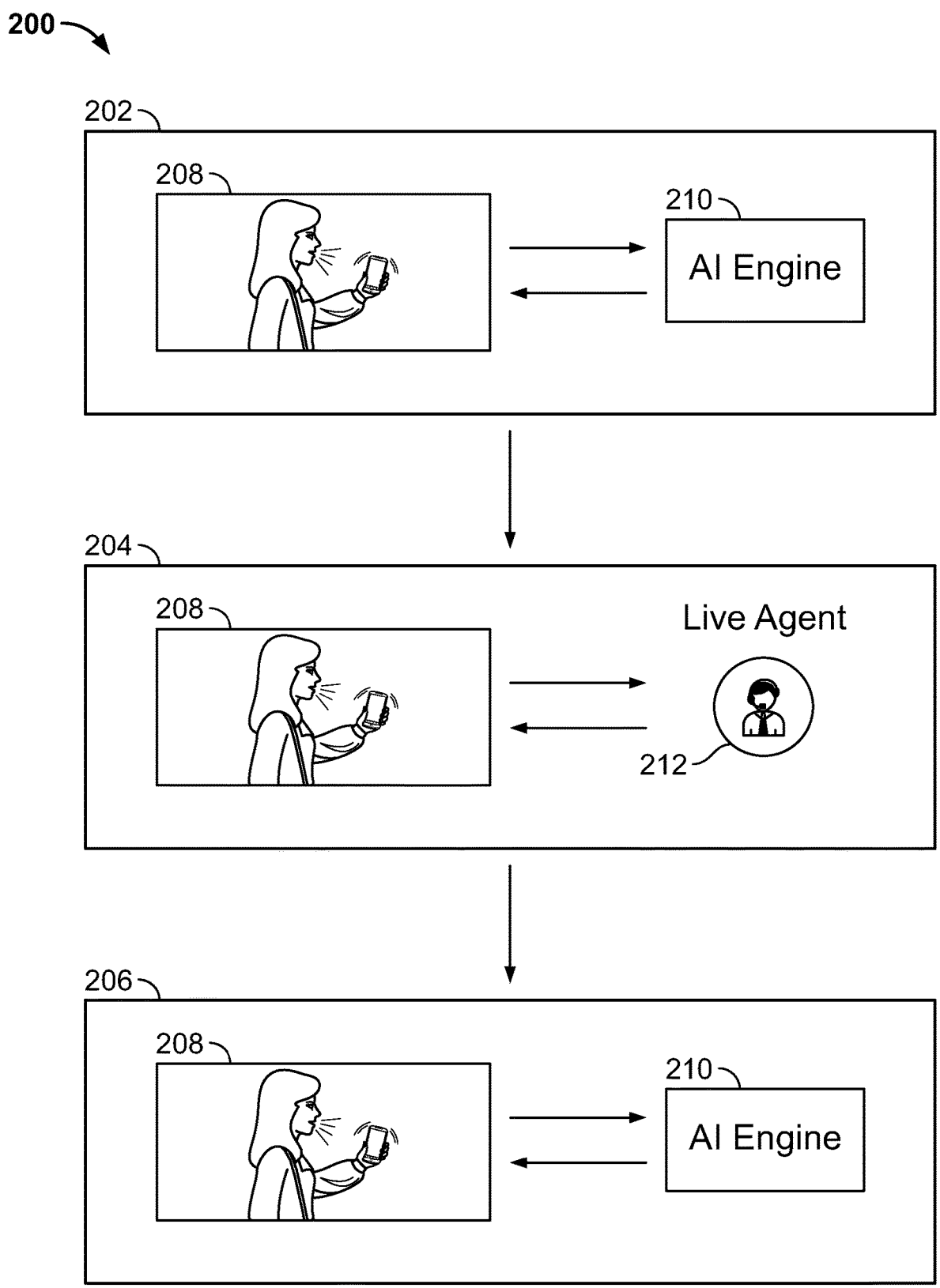
FIG. 2 shows an exemplary diagram in accordance with principles of the disclosure.

FIG. 2 shows an illustrative exemplary diagram 200 in accordance with principles of the disclosure. Exemplary diagram 200 is a high level diagram depicting the process of a caller within the IVR system in accordance with principles of the disclosure.

At display box 202, caller 208 initiates a conversation to the IVR system. The call may be answered and initially begin with the AI engine 210. Caller 208 may express a request and AI engine 210 may attempt to respond to the request. AI engine 210 may also repeat the request to confirm that the request is understood correctly.

At display box 204, caller 208 may be transferred to live agent 212. The caller may be transferred for one or more reasons. In one example, the caller may be transferred because the system may track the length of time of the conversation and when the time reaches a pre-determined amount of time, the system automatically may transfer the caller. In another example, the caller may have repeated the request more than one time, or may have repeated a portion of the request more than one time. The system, in this example, may automatically transfer the caller to the live agent 212 thereby avoiding the caller reaching a point of frustration. In yet another example, the caller may be transferred to the live agent 212 because the system may be tracking the decibel level of the voice inputs received from the caller. The decibel level may have reached a greater than average decibel level. The system, in this example, may automatically transfer the caller to the live agent 212.

Once live agent 212 connects with the caller 208, live agent 212 may decipher, based on the received voice inputs and additional conversation with the caller 208, what the caller's request may be. In some embodiments, live agent 212 may provide the response directly to caller 208. In this example, the call may terminate once the correct response is provided. In other embodiments, live agent 212 may select a response from a list of stored responses. The selected response may be transferred to AI engine 210 to transfer to the caller. This may enable the live agent 212 to disconnect from the call and be enabled to assist other caller's within the IVR system.

At display box 206, caller 208 may be linked to AI engine 210. AI engine 210 may provide the response selected by live agent 212 to caller 208. Caller 208 may be satisfied with the response and terminate the call. If caller 208 is not satisfied with the response, live agent 212 may be monitoring the call. Live agent 212 may intercept AI engine 210 and assist the caller until the caller 208 is satisfied.

Figure 3:
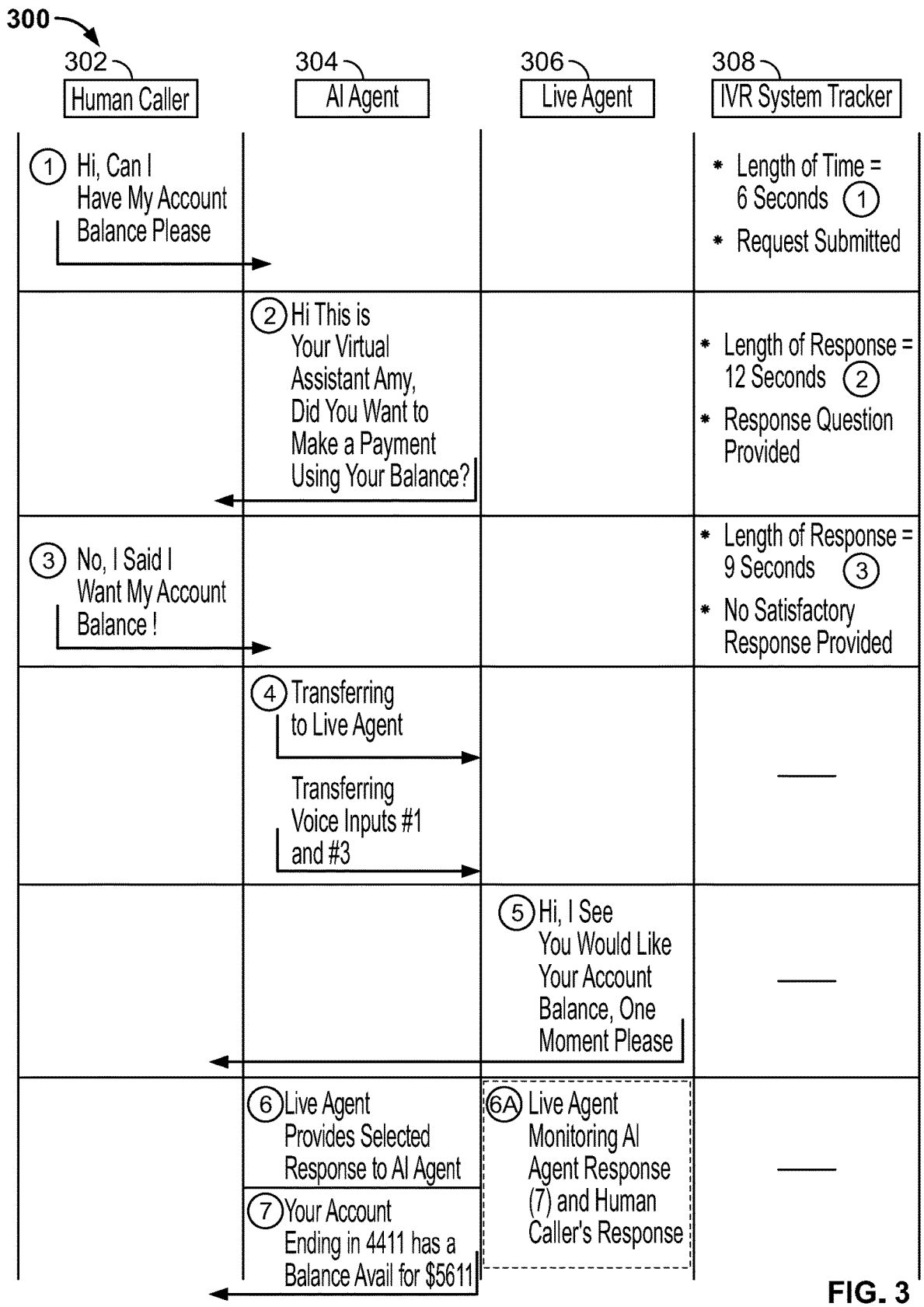
FIG. 3 shows an illustrative flowchart in accordance with principles of the disclosure.

FIG. 3 shows an illustrative flow chart of an IVR system 300 in accordance with principles of the disclosure. IVR system 300, in this illustrative flow chart, may display the human caller 302, AI agent 304, live agent 306 and an IVR system tracker 308. IVR system 300 may include the hardware and software displayed in FIG. 1.

At step 1, human caller 302 may initiate a conversation with AI agent 304. Caller 302 may express a request. The request, in this example, is a request for an account balance associated with the caller's account. The request may be received as voice inputs. The request may be received by AI agent 304.

IVR system tracker 308 may start tracking the length of the call as soon as caller 302 is connected to an agent. IVR system tracker may be an application on computer server 101 in FIG. 1. IVR system tracker 308 may track the length of the call when caller 302 is in direct communication with AI agent 304. In this example, the request submitted by caller 302 at step 1 may be a length of 6 seconds.

At step 2, AI agent may receive the voice inputs and attempt to provide an accurate response. At step 2, AI agent 304 may verify the request with caller 302. AI agent may transmit a response to caller 302. The response may be a question querying caller 302 to confirm that the request is understood by IVR system 300.

IVR system tracker 308 may continuously track the time. At the completion of AI agent 304 responding to caller 302, the length of time is 12 seconds. The call in total at this point is a total of 18 seconds. The time being tracked may also include each delay that may occur between the caller's request and the AI agent's response.

At step 3, caller 302 receives the response from AI agent 304. Caller 302, in this example, is not satisfied with the response. Additionally caller 302 repeats two or more of the words the caller expressed at step 1. IVR system tracker 308 may be tracking the sequences of utterances being received from caller 302. IVR system tracker 308 continues to track the length of the conversation. At this point an additional 7 seconds is tracked. The total length of time now is 25 seconds.

At step 4, IVR system 300 may automatically transfer caller 302 to live agent 306. Caller 302 may be transferred because the length of time of the call reached the pre-determined time of 25 seconds. Caller 302 may be automatically transferred because the system identified a repetition of two or more words in the sequence of utterances received from caller 302. At step 4, the voice inputs from step 1 and step 3 may also be transferred to live agent 306.

At step 5, live agent 306 receives a signal of a transfer of a caller. Live agent 306 may receive the voice inputs and the responses provided by AI agent 304. Live agent 306 may be enabled to immediately decipher what caller 302 may be requesting. While confirming the request with caller 302, live agent may be simultaneously selecting a pre-generated response, as shown at step 6, to enable AI agent to submit the selected pre-generated response to caller 302. By transferring the selected response to AI agent for submission to caller 302, this may enable live agent 306 to proceed with other calls and may not delay the time caller 302 may be awaiting a response.

At step 7, AI agent 304 may transfer the selected response received from live agent 306 to caller 302. The response may be received as an automated voice response. In some embodiments, the response may be received via text message and/or email associated with caller 302.

It should be appreciated that simultaneous to step 7 of the AI agent 304 and the human caller 302 communicating, live agent 306 may be monitoring, at step 6A, the AI agent's responses and the level of satisfaction of the caller 302. In the event that caller 302 is not satisfied with the selected response provided, live agent 306 may intercept the communication and complete the call with caller 302.

Figure 4:
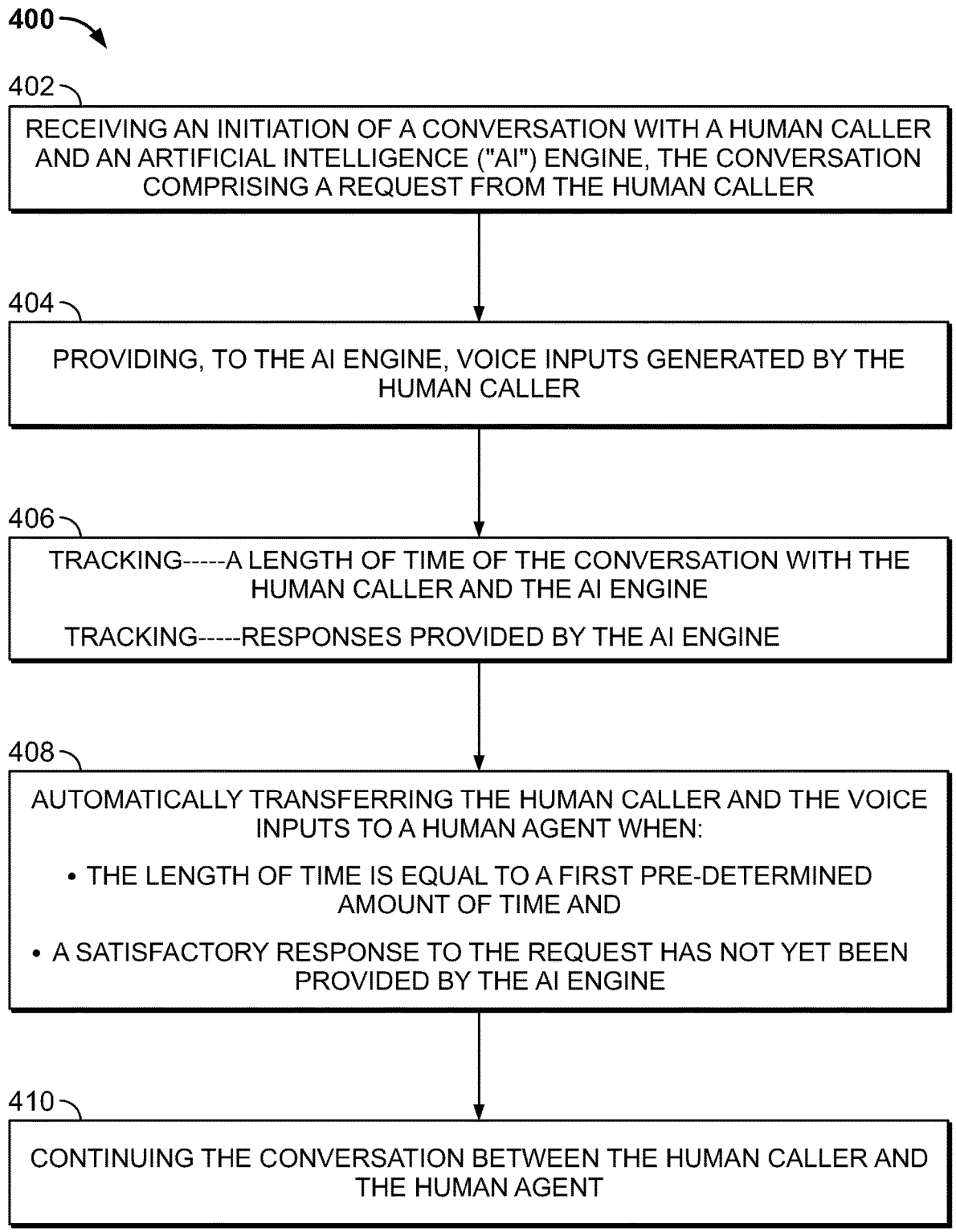
FIG. 4 shows an illustrative flowchart in accordance with principles of the disclosure.

FIG. 4 shows an illustrative method in accordance with principles of the disclosure. The illustrative method may include some or all of steps 402-410. The illustrative method may include steps in an order different from the illustrated order. The illustrative method may include method steps not illustrated in FIG. 4 but described herein.

At step 402, methods may include receiving an initiation of a conversation with a human caller and an AI engine. The conversation may include a request from the human caller. At step 404, methods may include providing, to the AI engine, voice inputs generated by the human caller. It should be appreciated that voice inputs may include other inputs received via chat messaging online.

At step 406, methods may include tracking the conversation. The tracking may include tracking a length of time of the conversation between the human caller and the AI engine. The tracking may also include tracking responses provided by the AI engine.

At step 408, methods may include automatically transferring the conversation to continue between the human caller and a live agent. The transferring may include transferring the human caller and the voice inputs received from the caller to the live agent. The automatic transferring may occur when the length of time of the conversation is equal or greater than a first pre-determined amount of time. In some embodiments the pre-determined amount of time may be 25 seconds. In some embodiments the pre-determined amount of time may be 20 seconds. In some embodiments the pre-determined amount of time may be 30 seconds. In some embodiments, the pre-determined amount of time may be 15 seconds. When the length of time is equal to or greater than the first pre-determined amount of time, methods may include confirming whether a satisfactory response has been provided. When the caller is not satisfied with the response, the call may be transferred to the live agent.

At step 410, following the transfer of the conversation to the live agent, methods may include continuing the conversation with the human caller. In some embodiments, the call may be completed at step 410. In other embodiments, once the live agent identifies the request, the live agent may select a machine generated response and transfer the call back to the AI agent to provide the selected machine generated response.

Thus, methods and apparatus for INTEGRATION OF HUMAN AGENT AND AUTOMATED TOOLS FOR IVR SYSTEMS is provided. Persons skilled in the art will appreciate that the present invention can be practiced by other than the described embodiments, which are presented for purposes of illustration rather than of limitation, and that the present invention is limited only by the claims that follow.

What is claimed is:

1. A method for leveraging artificial intelligence to integrate human and machine responses within an interactive voice response ("IVR") system, the method comprising:
receiving an initiation of a conversation with a human caller and an artificial intelligence ("AI") engine, the conversation comprising a request from the human caller;
providing, to the AI engine, voice inputs generated by the human caller;
tracking a length of time of the conversation with the human caller and the AI engine;
tracking responses provided by the AI engine;
automatically transferring the human caller and the voice inputs to a human agent when:
the length of time is equal to a first pre-determined amount of time; and
a satisfactory response to the request has not yet been provided by the AI engine, the satisfactory response comprising a response that triggers the human caller's delay of a second pre-determined amount of time;
continuing the conversation with the human caller and the human agent; and
simultaneous to the continuing the conversation, continuing to provide the voice inputs generated by the human caller to the AI engine.

2. The method of claim 1 wherein prior to providing the voice inputs to the AI engine, processing the voice inputs using natural language processing ("NLP").

3. The method of claim 1 wherein based on the continued conversation:
determining, by the human agent, a type of request;
receiving a selected response provided by the human agent based on the determination of the type of request; and
transferring back the human caller to the AI engine to provide the selected response to the human caller.

4. The method of claim 1 wherein the first pre-determined amount of time is a length of time equal to or greater than 25 seconds.

5. The method of claim 1 wherein the tracking further comprises tracking sequences of utterances within the conversation and when the human caller repeats a sequence of utterances more than one time, automatically transferring the human caller to the human agent.

6. The method of claim 1 wherein the tracking further comprises monitoring a decibel level of a voice of the human caller and when the decibel level reaches a level greater than 60 decibels, automatically transferring the human caller to the human agent.

7. The method of claim 1 wherein following the transferring back of the human caller to the AI engine to provide the selected response, continuously providing a voice-to-text rendition of the continuing conversation on a display screen, the display screen positioned within proximity of the human agent.

8. The method of claim 7 wherein when the selected response provided by the AI engine to the human caller is not the satisfactory response, changing a background-color on the display screen to alert the human agent.

9. The method of claim 7 wherein when the selected response provided is not the satisfactory response, transferring back the human caller to the human agent to complete the conversation.

10. The method of claim 1 wherein the user's side delay is a delay due to a selection of a link provided by the AI agent in a text-message in response to the conversation.

11. An interactive voice response system ("IVR") comprising:
a telephony server configured to:
receive an initiation of a conversation submitted by a caller using a communication network, the conversation comprising voice inputs associated with a request;
provide an interface for the caller to interact with an artificial intelligence ("AI") engine over the communication network; and
transmit to the caller, over the communication network, responses to the voice inputs generated by the AI engine; and
an application server hosting the AI engine configured to:
receive, continuously, from the telephony server, the voice inputs generated by the caller and the responses to the voice inputs generated by the AI engine;
generate a machine interpretation of the voice inputs;
monitor the voice inputs by:
tracking a length of time of the continuously received voice inputs generated by the caller; and
monitoring the responses to the voice inputs generated by the AI engine;
wherein when the length of time is equal to a first pre-determined amount of time and a satisfactory response to the request has not yet been provided by the AI engine, the satisfactory response comprising a response that triggers a human caller delay of a second pre-determined amount of time, the application server is configured to:
- transmit an instruction to the telephony server to automatically transfer the caller to a human agent;
- link a terminal accessible by the human agent to the application server;
- transmit to the human agent, the machine interpretation of the voice inputs and the responses generated by the AI engine;
- continue the conversation, via the terminal, between the caller and the human agent;
- continuously provide to the human agent a voice-to-text rendition of the continuing conversation on a display screen associated with the human agent;
- based on the continued conversation and the machine interpretation of the voice inputs, determine by the human agent, a request of the caller, the request being associated with the voice inputs generated by the caller; and
- following the determination of the request, the application server is further configured to:
  - receive, from the human agent, a selected response associated with the request, the selected response being the satisfactory response;
  - pause the terminal linking the human agent to the caller; and
  - provide, by the AI agent, the selected response to the caller;

wherein, when the selected response provided by the AI engine to the human caller is not the satisfactory response, the application server is configured to transmit an alert to the human agent on the display screen.

12. The system of claim 11 wherein the pre-determined amount of time is a length of time equal to or greater than 25 seconds.

13. The system of claim 11 wherein the tracking further comprises tracking sequences of utterances from the voice inputs and when the caller repeats a sequence of utterances more than one time, transmit an instruction to the telephony server to automatically transfer the caller to the human agent.

14. A method for leveraging artificial intelligence to integrate human and machine responses within an interactive voice response ("IVR") system, the method comprising:

- receiving an initiation of a conversation with a human caller and an artificial intelligence ("AI") engine, the conversation comprising a request from the human caller;
- providing, to the AI engine, voice inputs generated by the human caller;
- tracking:
  - sequences of utterances extracted from the voice inputs; and
  - responses provided by the AI engine;
- automatically transferring the human caller and the voice inputs to a human agent when:
  - a sequence of utterances from the sequences of utterances is determined to be repeated more than once; and
  - a satisfactory response to the request has not yet been provided by the AI engine, the satisfactory response comprising a response that triggers the human caller's delay of a second pre-determined amount of time;
- continuing the conversation with the human caller and the human agent;
- based off of the continuing conversation and the transferred voice inputs, determining, by the human agent, a type of request;
- receiving a selected response provided by the human agent based on the determination of the type of request;
- transferring back the human caller to the AI engine to provide the selected response to the human caller;
- following the transferring back of the human caller to the AI engine to provide the selected response, continuously providing a voice-to-text rendition of the continuing conversation on a display screen associated with the human agent; and
- wherein, when the selected response provided by the AI engine to the human caller is not the satisfactory response, changing a background-color on the display screen to alert the human agent.

15. The method of claim 14 wherein when at least two or more utterances within a sequence of utterances is repeated in a subsequent sequence of utterances, automatically transferring the human caller to the human agent.

* * * * *